(12) United States Patent
Mau et al.

(10) Patent No.: US 6,789,769 B2
(45) Date of Patent: Sep. 14, 2004

(54) FLEXIBLE AIRFLOW SEPARATOR TO REDUCE AERODYNAMIC NOISE GENERATED BY A LEADING EDGE SLAT OF AN AIRCRAFT WING

(75) Inventors: Knut Mau, Hamburg (DE); Werner Dobrzynski, Wolfenbuettel (DE)

(73) Assignees: Airbus Deutschland GmbH, Hamburg (DE); Deutsches Zentrum fuer Luft-und Raumfahrt e. V., Cologne (DE)

( * ) Notice: Subject to any disclaimer, the term of this patent is extended or adjusted under 35 U.S.C. 154(b) by 0 days.

(21) Appl. No.: 10/302,454

(22) Filed: Nov. 22, 2002

(65) Prior Publication Data

US 2003/0226936 A1 Dec. 11, 2003

(30) Foreign Application Priority Data

Nov. 24, 2001 (DE) ......................... 101 57 849

(51) Int. Cl.$^7$ ................................. B64C 3/00
(52) U.S. Cl. ...................... 244/214; 244/200; 244/216; 244/130
(58) Field of Search ................................ 244/201, 200, 244/199, 210, 216, 214, 215, 130, 190, 213

(56) References Cited

U.S. PATENT DOCUMENTS

| | | | | |
|---|---|---|---|---|
| 1,909,186 | A | * 5/1933 | Lougheed | 244/200 |
| 2,322,632 | A | * 6/1943 | Harperm, Jr. | 244/200 |
| 5,056,741 | A | * 10/1991 | Bliesner et al. | 244/214 |
| 6,394,396 | B2 | 5/2002 | Gleine et al. | |
| 6,454,219 | B1 | * 9/2002 | Moe | 244/214 |
| 6,457,680 | B1 | * 10/2002 | Dobrzynski et al. | 244/214 |

FOREIGN PATENT DOCUMENTS

| | | |
|---|---|---|
| DE | 19925560 | 12/2000 |
| DE | 10019185 | 10/2001 |

OTHER PUBLICATIONS

Aerodynamic effects of leading edge serrations on a two dimensonal airfoil, NASA TM X–2643 Sep. 1972.*
"Noise Reducing Vortex Generators on Aircraft Wing control Surfaces", by Borchers et al.; Publication No. US–2001–0032907–A1, Publication Date: Oct. 25, 2001.
"Airframe Noise Studies on Wings with Deployed High–Lift Devices", by Werner Dobrzynski et al.; Deutsches Zentrum fuer Lift- und Raumfahrt e.V. (DLR), Institut fuer Entwurfsaerodynamik, Abteilung Technische Akustik, Forschungszentrum Braunschweig, Germany, published in the American Institute of Aeronautics and Astronautics, $4^{th}$ AIAA/CEAS Aeroacoustics Conference, Jun. 2–4, 1998, Toulouse France.

* cited by examiner

*Primary Examiner*—Galen Barefoot
(74) *Attorney, Agent, or Firm*—W. F. Fasse; W. G. Fasse

(57) ABSTRACT

A slat is selectively extended from a main wing body, with a concave rear surface of the slat facing a convex forward nose surface of the wing body, with a slat gap therebetween. At least one row of flexible bristles is movably arranged relative to the lower rear edge of the slat, to flexibly protrude up into the slat air gap. At least one row of flexible bristles is movably arranged along the upper rear edge of the slat to extend rearwardly over the slat air gap and the upper surface of the main wing body. The flexible bristles are flexibly self-positioning and self-contouring due to the aerodynamic forces acting thereon, to improve the air flow conditions through the slat gap, separate the slat gap airflow from an entrapped eddy vortex on the concave rear surface of the slat, and thereby reduce the aerodynamic noise generated along the slat gap.

20 Claims, 7 Drawing Sheets

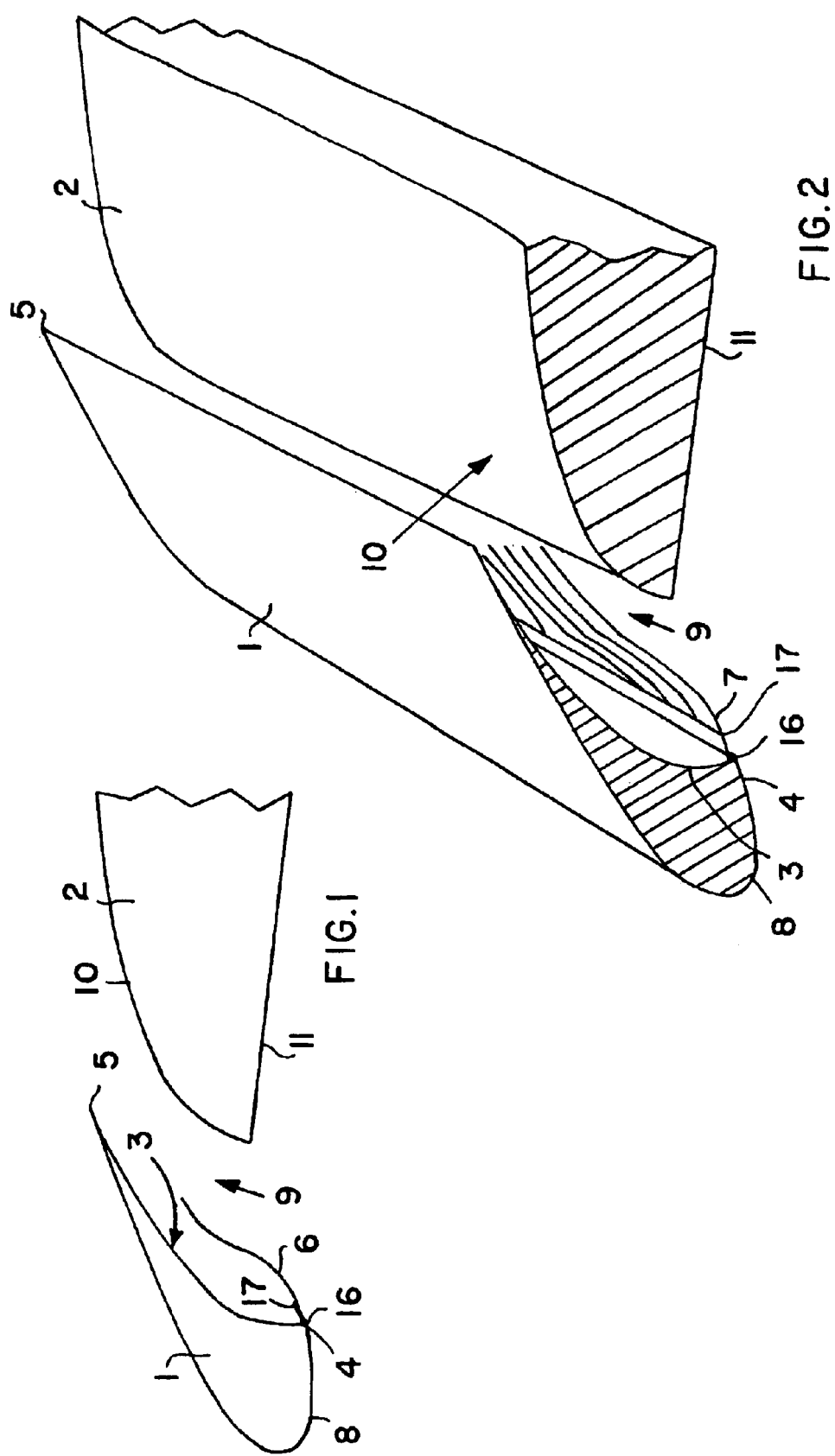

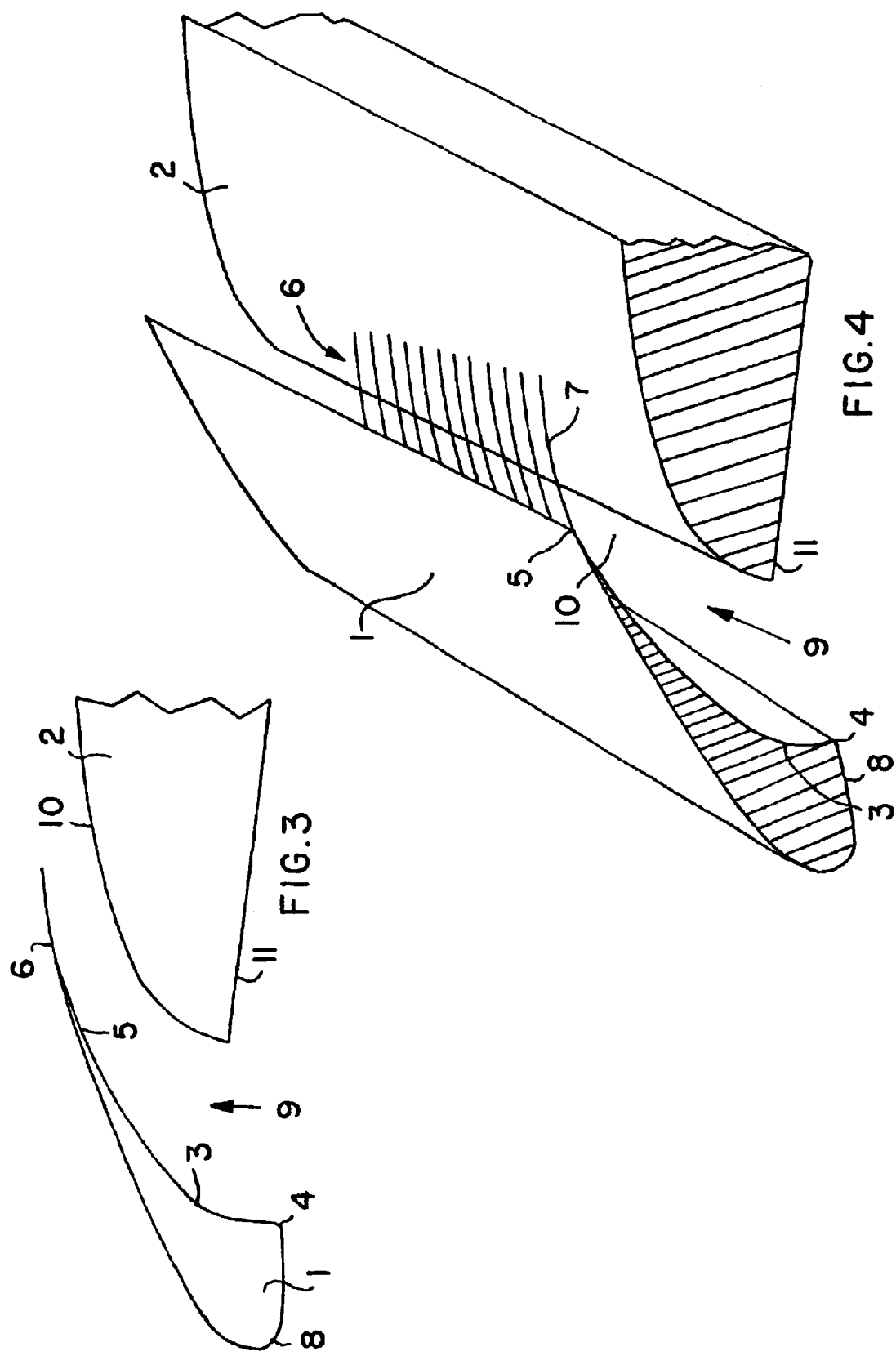

FLEXIBLE AIRFLOW SEPARATOR TO REDUCE AERODYNAMIC NOISE GENERATED BY A LEADING EDGE SLAT OF AN AIRCRAFT WING

PRIORITY CLAIM

This application is based on and claims the priority under 35 U.S.C. §119 of German Patent Application 101 57 849.0, filed on Nov. 24, 2001, the entire disclosure of which is incorporated herein by reference.

FIELD OF THE INVENTION

The invention relates to an arrangement for reducing the aerodynamic noise generated by a leading edge slat of a main wing of a commercial passenger transport aircraft.

BACKGROUND INFORMATION

Modern commercial passenger transport aircraft are equipped with high-lift auxiliary devices that are typically deployed during take-off and/or landing phases of a flight in order to increase the lift generated during relatively low flight speeds. These high-lift auxiliary devices include leading edge slats and landing flaps, which are respectively movably connected to the leading edge area and the trailing edge area of a main wing, so as to be selectively extendible from or retractable to the main wing. In the extended or deployed positions, these high-lift auxiliary devices, in addition to the extended landing gear, represent the major generators of aerodynamic flow noise of commercial transport aircraft. For example, typical leading edge slats used on modern commercial transport aircraft are of the Handley Page slat type, which forms an air gap or slot between the slat and the forward nose of the main wing. The air flowing through this gap or slot achieves the desired increase of the generated lift, but simultaneously also leads to an increased noise generation. This aerodynamically generated slat gap noise can actually reach or exceed the noise level magnitude of the jet engines, when the engines are sharply throttled back during a landing approach.

In view of the above, it has long been a serious problem and the subject of substantial research in the field of aircraft design, to reduce the aerodynamically generated noise of the air flowing over various aircraft structures, and especially the extended high-lift auxiliary devices, and particularly the extended leading edge slats. For example, results of a flight research program of the Federal Republic of Germany have shown that the leading edge slat contributes a higher proportion of the total noise, in comparison to the noise generated by the landing flap. Detailed studies have identified a well-developed entrapped eddy vortex in the airflow on the concavely curved rear surface or inner surface of the leading edge slat facing the forward nose surface of the main wing. This entrapped eddy vortex is a significant potential noise source.

The noise generation of this entrapped eddy vortex is understood as follows. A flow separation of the gap airflow constantly occurs between the slat and the main wing along the above mentioned concavely curved inner surface of the extended slat, and thus generates the entrapped eddy vortex. This vortex is continuously supplied with energy by the accelerated gap airflow bordering along the slat. Also, small turbulence cells are continuously formed along the boundary or flow separation line between the vortex flow area and the continuous gap airflow flowing through the gap. These turbulence cells continuously become entrained in the accelerated gap flow, whereby the major noise is generated, especially due to the further flow of these turbulence cells past the upper rear or trailing edge of the slat and then over the upper surface of the main wing.

A study by Dr. Werner Dobrzynski, Mr. Burkhard Gehlhar, and others, entitled "Airframe Noise Studies on Wings with Deployed High-Lift Devices", Deutsches Zentrum fuer Lift- und Raumfahrt e.V. (DLR), Institut fuer Entwurfsaerodynamik, Abteilung Technische Akustik, Forschungszentrum Braunschweig, Germany, published in the American Institute of Aeronautics and Astronautics, $4^{th}$ AIAA/CEAS Aeroacoustics Conference, Jun. 2–4, 1998, Toulouse France, is also directed to the reduction of aerodynamic noise on an extended leading edge slat of an aircraft. Among other things, this study investigates a possible solution to the noise problem, which involves an airflow guide plate that is hingedly secured to the leading edge slat in the area of the inner or rearward profile area thereof and extends in a direction toward the main wing in the airflow direction. This airflow guide plate is hinged and can thus be pivoted inwardly relative to the leading edge slat. This solution aims to reduce the noise level during take-off and landing of an aircraft with extended slats. When the slat is retracted for cruise flight, the guide plate is then pivoted inwardly against the slats.

Although the above described arrangement of a hinged airflow guide plate may have achieved noise reductions in wind tunnel tests, this solution is not expected to find substantial use in real world applications, in view of practical considerations and difficulties in the actual practice thereof. For example, in the retracted condition of the leading edge slat, e.g. the cruise configuration, the guide plate must be pivoted or tilted against the rearward profile surface of the leading edge slat, and must then have a contour or configuration that is sufficiently matched to the rear curvature of the slat. However, that is not the proper curvature contour of the guide plate for its operation. Furthermore, the retracted position of the slat does not provide sufficient space to allow such a rigidly configured guide plate to be stored between the retracted slat and the nose area of the main wing. On the other hand, if the guide plate is to be flexible, to adapt itself to the curvature of the available space in the retracted and stowed condition of the slat, then such a flexible guide plate would not have sufficient strength and stiffness to durably withstand the significant aerodynamic forces that arise from the airflow through the slat gap in the extended condition of the slat. As a result, the guide plate will tend to flutter, with the end result of radiating noise, which is directly contrary to the intended noise reduction effect.

Furthermore, a pivotally connected or hinged guide plate requires additional mechanically movable parts, which disadvantageously lead to an increase of the manufacturing, installation, maintenance and repair costs, as well as an increase of the total installed weight in the aircraft. Another problem is that the transition from the lower surface of the slat to the hinge of the guide plate or separation surface must be free from contour discontinuities or jumps as well as open slots, which therefore requires very high fabrication and installation accuracy with low tolerances.

Another problem is that the metal guide plate or separation surface is subjected to considerable alternating forces that are initiated by the airflow. Since this guide plate or separation surface is connected only to the bottom edge of the slat via the hinge joint, and no further supports or stiffening arrangements are provided, there is a significant danger that the guide plate or separation surface will be stimulated to oscillate or vibrate back and forth. That would cause significant airflow disruption, drag, and additional noise. Furthermore, since the contour of the rear surface of the slat, as well as the geometry of the air gap, varies over the span of the wing, the various elements of this guide plate or airflow separation surface must be formed with a taper or angled inclination over the span, which leads to additional complication of the retraction mechanism. The situation of any fault or failure becomes especially critical, for example if the mechanism becomes blocked, because then the slat can no longer be retracted.

The above cited publication gives no suggestions or motivations toward overcoming or avoiding these disadvantages, or toward any other device or arrangement that might achieve a better overall result without suffering such disadvantages.

The German Patent Publication DE 199 25 560 A1 aims to reduce the above discussed aerodynamic noise by installing a massive separating member forming a separation surface that is movable relative to the slat, for example in the manner of a formed metal plate along the airflow boundary or separating line between the above mentioned entrapped eddy vortex and the slat gap airflow. Nonetheless, the above discussed disadvantages would also apply to such an arrangement. Additionally, there is a danger that such a covering of the concave curved inner surface or rear surface of the slat will form a resonance volume, which will actually lead to an increased noise radiation. Insofar as this formed metal plate, which is movably connected to the inner bottom edge of the extended slat, does not completely cover, enclose and separate the rear inner surface of the slat and therewith the entrapped eddy vortex, it must be assumed that the gap flow that flows between this metal plate and the nose curvature of the main wing will separate and become turbulent along the rear free edge of the metal plate, which will energize and excite the separated air forming the entrapped eddy vortex to undergo resonance oscillations, which in turn will generate a low frequency noise.

Furthermore, the German Patent Publication DE 100 19 185 A1 and corresponding U.S. Pat. No. 6,394,396 (Gleine et al.) disclose an arrangement for reducing the aerodynamic noise of a leading edge slat of the main wing of a commercial passenger transport aircraft, including a hollow expandable and contractible displacement element secured onto the concave rear surface of a slat facing the leading edge of the aircraft wing. A bleed air line supplies engine bleed air through a suitable control arrangement into the hollow displacement element to selectively expand or contract the displacement element. When the slat is extended, the displacement element is expanded to fill-out the concave cavity on the rear surface of the slat so as to prevent the formation of an entrapped eddy vortex in the slat air gap, and thereby reduce the generation of aero-acoustic noise. When the slat is retracted, the displacement element is contracted to be conformingly accommodated in the sickle-shaped space between the slat and the leading edge of the wing. While this arrangement achieves a significant reduction of the aerodynamically generated noise, the system requires an active control arrangement, and the expandable displacement element is subject to aging degradation as well as wear and the like.

It would thus be desirable to develop a system that has lower inspection and maintenance requirements, a higher durability and reliability, and that does not require an active control arrangement.

SUMMARY OF THE INVENTION

In view of the above, it is an object of the invention to provide an arrangement for reducing aerodynamically generated noise on a leading edge slat on a main wing of a commercial transport aircraft, with a simple, lightweight structure and arrangement, and a simple installation and retrofitting capability, and without negatively influencing the aerodynamic characteristics such as lift and drag of the overall wing structure. Moreover, in the event of a failure of any component of the arrangement, there must be no dangerous effects on the further proper and safe operation of the slat and the aircraft overall. Thus, the invention further aims to avoid or minimize the use of additional movable mechanical components and actively actuated components. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a wing arrangement for an aircraft, including a wing body having a forward nose, and a slat arranged with its concave rear surface facing toward the forward nose of the wing body, whereby the slat is movably connected to the wing body to be movable between a retracted slat position with the concave rear surface of the slat facing and adjacent to the forward nose of the wing body, and an extended slat position in which the slat is spaced away from the forward nose with a slat air gap bounded between the slat and the forward nose. The inventive arrangement further particularly comprises plural bristles, fibers, hairs, threads, or the like, generally called "bristles" herein, which are distributed to form at least one row along the lower rearward edge and/or the upper rearward edge of the slat in the span direction.

The bristles are preferably flexible so that they are self-adjusting or self-contouring by the aerodynamic forces exerted on them by the respective prevailing airflow conditions, so that the row of bristles forms a smoothly contoured separation between the entrapped eddy vortex on the rear concave side of the slat, and the smooth gap airflow through the slat gap. Due to their flexibility, when the slat is retracted, the flexible bristles will also easily deform to be received and stowed in the sickle-shaped space remaining between the concave rear surface of the slat and the convex forward surface of the leading edge nose of the wing body.

Additionally, to facilitate the self-orienting movement of the flexible bristles in the extended condition of the slat, and the self-stowing movement of the bristles in the retracted condition of the slat, the base ends of the bristles may be hingedly connected to the lower rear edge or the upper rear edge of the slat, for example by means of a carrier element extending longitudinally in the span direction along the slat. This enables a pivoting or hinging movement of the bristle arrangement overall, in addition to the flexible self-contouring of each individual bristle.

The bristles are preferably provided and arranged with a sufficient number and density of bristles to form an aerodynamically effective separation surface between the entrapped eddy vortex and the smooth or laminar gap airflow as mentioned above. However, the density of the bristles is limited so that the bristles preferably do not form a closed or airtight separation surface, but instead allow a limited air permeability through the airflow separation surface, to provide a controlled pressure compensation between the entrapped eddy vortex and the smooth gap airflow on opposite sides of the separation surface. The limited air permeability through the separation surface formed by the bristles achieves a gradual or smooth compensation of the turbulent alternating pressure conditions that exist between the entrapped eddy vortex and the gap airflow in the flow direction thereof. The overall result is a substantial reduction of the aerodynamically generated noise in the slat gap area.

BRIEF DESCRIPTION OF THE DRAWINGS

In order that the invention may be clearly understood, it will now be described in connection with example embodiments thereof, with reference to the accompanying drawings, wherein:

FIG. 1 is a schematic side view of an arrangement according to the invention for reducing the aerodynamically generated noise using an airflow separation surface formed of flexible bristles connected to the lower rear edge of a leading edge slat extended from the forward nose of a main wing;

FIG. 2 is a schematic perspective view of the arrangement of FIG. 1;

FIG. 3 is a schematic side view similar to that of FIG. 1, but showing an airflow separation surface formed of a row of bristles extending from the upper rear edge of the slat;

FIG. 4 is a schematic perspective view of the arrangement of FIG. 3;

DETAILED DESCRIPTION OF A PREFERRED EXAMPLE EMBODIMENT AND OF THE BEST MODE OF THE INVENTION

Figure 9:
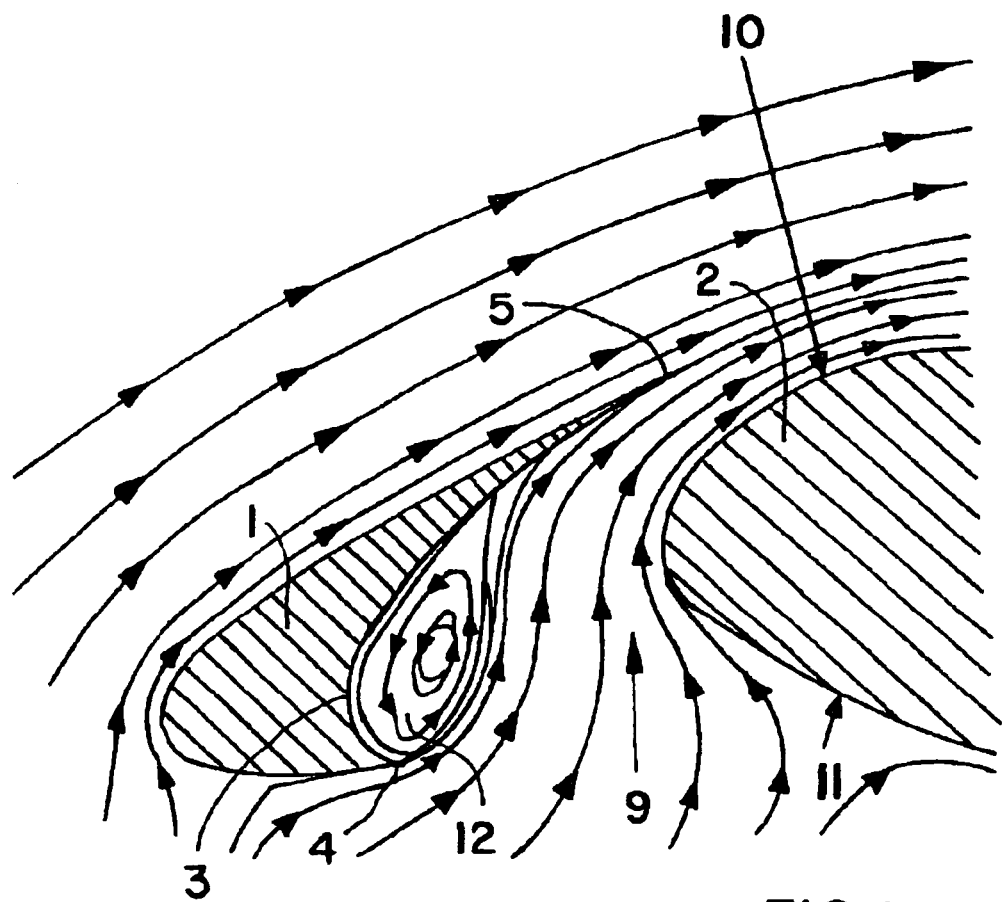
FIG. 9 is a detailed cross-sectional side view of a conventional wing arrangement with a slat extended from the forward nose of a wing body, without the inventive airflow separation surface, showing the formation of an entrapped eddy vortex.

For a general background understanding of the aerodynamic noise generation that is to be addressed by the present invention, reference is first made to FIG. 9, showing a conventional wing arrangement. As shown in FIG. 9, a conventional wing arrangement includes a leading edge slat 1 extended forwardly from the forward nose of a main wing body 2, for example of a commercial passenger transport aircraft. The slat 1 has a concave rearward surface 3, while the forward nose of the main wing body 2 has a convex surface, with a slat air gap 9 formed therebetween when the slat is in the extended position. An accelerated slat gap airflow flows from the underside 11 of the wing upwardly through the slat air gap 9 and over the upper surface 10 of the main wing body 2. This creates an increased lift generation. However, this also causes the formation of an entrapped eddy vortex 12 along the concave rear surface 3 of the slat 1.

This entrapped eddy vortex 12 generates and radiates aerodynamic noise along the entire span of the slat, resulting in a substantial total noise generation level. Particularly, the entrapped eddy vortex 12 is formed by the turbulent separation of the airflow along the lower rear edge of the slat 1, and is constantly supplied with more aerodynamic energy from the adjoining gap airflow that flows through the slat gap 9. A fictitious flow boundary exists between the eddy vortex 12 and the gap flow, and turbulence cells are constantly formed along this boundary which represents a discontinuity. These turbulence cells are then pulled along with and into the accelerated gap flow, which gives rise to the generated aerodynamic noise, especially when the turbulence cells or pockets separate and flow over the upper rear or trailing edge 5 of the slat 1.

In order to reduce the intensity of this entrapped eddy vortex 12, and to thereby accordingly reduce the aerodynamic noise generation, the invention provides an arrangement that will now be discussed in connection with FIGS. 1 to 4. The inventive arrangement has been experimentally shown to significantly reduce the aerodynamically generated noise level, as shown and discussed in connection with FIGS. 5 to 8.

FIG. 1 shows a schematic sectional or side view of a wing arrangement according to the invention, which basically corresponds to the conventional arrangement of FIG. 9 as a starting point. Namely, the inventive wing arrangement includes a slat 1 that is movably connected to a main wing body 2, so as to be extendible into an extended position, and retractable into a retracted position. The slat 1 has a concavely curved rear surface 3, while the forward nose of the wing body 2 has a convexly curved surface. In the retracted position, the slat 1 is retracted close to the wing body 2, so that the rear concave surface 3 of the slat 1 is arranged close and substantially conformingly along the convex surface of the forward nose of the main wing body 2. In order to reduce the intensity of, or avoid the formation of, an entrapped eddy vortex 12 as mentioned above, the present embodiment of the invention further provides an airflow separation surface 6 made up of at least one row of adjacently arranged bristles 7 extending from the lower rear or trailing edge 4 of the slat 1 in the span direction.

Preferably, the bristles 7 are arranged with a selected density in the span direction along the slat 1 so that the separation surface 6 remains air permeable, and the bristles are flexible so that the separation surface 6 is flexibly deformable and adaptable. These are significant features of the invention in comparison to the various rigid and solid, i.e. non-air-permeable, devices or arrangements that have been suggested by the prior art as discussed above. The inventive arrangement avoids the disadvantages and problems of the prior art, which have also been discussed above.

In a resting or inactive condition, e.g. if the slat is extended while the aircraft is on the ground and standing still, so that there is no airflow, the row of bristles 7 will extend rearwardly and somewhat upwardly as a smooth continuation of the outer contour of the lower outer surface 8 of the slat 1. The bristles 7 are sufficiently stiff so that they are self-supporting and form-stable against the gravitational force in such an inactive condition. In other words, the bristles preferably have a sufficient rigidity to be self-supporting and form-stable against the force of gravity, in a resting or inactive condition. Namely, when there is no airflow through the slat gap, e.g. when the aircraft is parked on the ground with slats extended, the bristles 7 are not so flexible as to hang downward due to the force of gravity, but rather are self-supporting so as to extend rearwardly, e.g. in a smooth continuation of the outer contour of the lower outer surface 8 of the slat 1.

On the other hand, as can be seen in the operating condition shown in FIGS. 1 and 2, when an airflow flows through the slat gap 9 between the slat 1 and the main wing body 2 (e.g. during take-off or landing of the aircraft with the slat 1 extended), the bristles 7 are sufficiently flexible so as to be individually flexibly self-orienting and self-configuring to form a suitably contoured airflow separation surface 6, by the aerodynamic forces exerted by the gap airflow. In other words, the bristles 7 are flexible enough so that they will flexibly bend, to be oriented and flexibly contoured or configured in an adaptive manner, due to the respective momentary arising aerodynamic forces acting on the bristles.

The bristles 7 have a sufficient flexibility so that they will be automatically self-bending and self-configuring, as described above, by the effects of the aerodynamic forces of the air flowing through the slat gap 9. Thereby, the bristles 7 will take on a different flexibly deflected and curved shape respectively in different extended positions (e.g. partial extension versus complete extension) of the slat 1. In this manner, the bristles 7 will always be automatically flexibly contoured, and therewith the flexible airflow separation surface 6 will always be automatically flexibly contoured to have the proper aerodynamic contour shape and position to act as a separation between the accelerated airflow flowing through the slat gap 9, and the entrapped eddy vortex 12 between the separation surface 6 and the concave rear surface 3 of the slat 1.

Thereby, the airflow separation surface 6 formed of at least one row of the bristles 7 will at least partially separate and contain any arising entrapped eddy vortex 12 between the airflow separation surface 6 and the concave rear surface 3 of the slat 1. The transfer of energy from the accelerated gap airflow flowing through the slat gap 9 to the entrapped eddy vortex 12 is reduced or avoided, which thereby in turn significantly reduces the energy and intensity of the entrapped eddy vortex 12. Also, the formation, separation, and entrainment of turbulence cells along the airflow boundary, now taken up by the separation surface 6, into the gap flow will be substantially reduced or prevented. The inventive arrangement of bristles 7 largely prevents the formation of a turbulent, free, and thus unstable, airflow shear layer. This self-adapting separation surface 6 thus hydrodynamically decouples the gap airflow from the air constrained between the separation surface 6 and the concave rear surface 3 of the slat 1. Moreover, the limited or controlled air permeability through the bristles of the separation surface 6 avoids a complete sealed containment of an eddy vortex, so that a pressure compensation between the two areas on opposite sides of the separation surface is still ensured, whereby resonances and other tonal effects are avoided. The invention thereby achieves a substantial reduction of the noise generated in the area of the slat gap, as will be further discussed below.

In comparison to a rigid separation surface, for example a conventional rigid separation surface realized with a rigid metal plate, the flexible bristles 7 forming a flexible separation surface 6 will automatically self-adjust their position and curved configuration, depending on the respective existing aerodynamic flow conditions. Thus, for different amounts of extension of the slat 1, e.g. partial extension versus full extension, the bristles 7 will continuously self-adjust due to the dynamic flow pressure in the slat gap 9, so that the row of bristles 7 forming the airflow separation surface 6 will always be smoothly positioned and contoured to extend along the above mentioned fictitious airflow boundary surface between the entrapped eddy vortex 12 and the accelerated gap airflow in the gap 9.

The self-positioning of the row of bristles 7 can be further improved by providing a movable hinge connection 16 of the secured base end of the bristles 7 to the lower rear edge 4 of the slat 1. Such a pivotable hinged connection 16 gives the bristles 7 an increased mobility, to allow a self-positioning during operation, and to also improve a self-stowing ability. Namely, when the slat 1 is retracted into a retracted configuration for cruise flight, the flexible bristles 7 will be easily pivoted about the hinge connection 16, and also flexibly deformed to the extent necessary, so as to be smoothly contoured along the concave rear surface 3 of the slat 1, when the slat 1 is pressed toward the convex forward nose of the main wing body 2.

This repositioning of the flexible bristles 7 requires no active actuation or movement of the bristles 7, but rather is carried out "automatically" by the aerodynamic forces, as well as the mechanical force exerted by the actuators of the slat 1, while pressing the slat 1 toward the forward nose of the main wing body 2.

In order to achieve the above mentioned hinged connection 16 of the individual bristles 7 to the lower rear edge 4 of the slat 1, or as an alternative thereto, the individual bristles 7 can be secured to and protrude from a continuous carrier element 17 that extends longitudinally along the span direction of the slat 1. The carrier element may be hingedly connected at 16 to the lower rear edge 4 of the slat 1, or may be carried by a movable element of the retraction and extension mechanism of the slat 1 (i.e. the mechanism that movably connects the slat to the wing body). In any event, the carrier element 17 may be contacted by or operatively coupled to the retraction and extension mechanism of the slat 1, so that the carrier element 17 and therewith the individual bristles 7 can be actively moved in concert with the extension or retraction of the slat 1 relative to the main wing body 2. The particular details of the slat extension, retraction and guide mechanism are not shown or described herein, because various alternatives are well known to persons of ordinary skill in the art. The principle requirement of the invention in regard to this embodiment feature is that the carrier element 17 must be linked or coupled to the slat extension, retraction and guide mechanism so as to move the carrier element 17 and the bristles 7 as described herein.

Particularly, when the slat 1 is moved into the extended position as shown in FIGS. 1 and 2, the carrier element 17 generally positions and orients the bristles 7 in a direction extending rearward and upward from the lower rear edge 4 of the slat 1, so that the bristles 7 extend upwardly and rearwardly into the slat air gap 9.

On the other hand, when the slat 1 is being retracted, the carrier element 17 is pivoted or otherwise moved, to move the carrier element 17 and the bristles 7 either flushly against the concavely curved rear surface 3 of the slat 1, or rearwardly from the slat 1 to extend flushly along the lower surface 11 of the main wing body 2. As a further alternative in the retracted position, the carrier element 17 and therewith the bristles 7 can be oriented to lie flushly along the upper surface 10 of the forward nose of the main wing body 2. As an alternative to being hinged or otherwise connected directly at the lower rear edge 4 of the slat 1, the carrier element 17 could be arranged along or connected to the lower surface 8 of the slat 1 or along the concave rear surface 3 of the slat 1 adjacent or proximate to the lower rear edge 4.

As a further alternative, as mentioned above, the carrier element 17 does not need to be directly connected to the slat 1 at all, but instead could be connected to the guide or linkage elements by which the slat 1 is movably connected to the main wing body 2, so that the carrier element 17 is driven and moved into the proper positions along with the slat 1. The bristles 7 can be arranged to protrude substantially perpendicularly from an adjusting surface of the carrier element 17, or from any edge or end thereof.

FIGS. 3 and 4 illustrate an alternative arrangement of bristles 7 forming an airflow separation surface 6 according to the invention, which can be used in combination with, or instead of, the arrangement according to FIGS. 1 and 2. A combination of the inventive airflow separation surfaces 6 at both the lower rear edge 4 and the upper rear edge 5 of the slat 1 will achieve an additive reduction of the overall noise, because the bristles along the lower rear edge of the slat will reduce the magnitude of the original noise source, while the bristles along the upper rear edge of the slat will reduce the noise being radiated from this upper edge. These two noise reduction mechanisms will be combined or added to each other.

In the arrangement of FIGS. 3 and 4, the airflow separation surface 6 of bristles 7 extends from the upper rear or trailing edge 5 of the slat 1. This arrangement serves to reduce the radiation of edge noise, which would otherwise be generated due to the separation of a turbulent flow along the end edge of a surface, and particularly along the upper rear edge 5 of the slat 1, through conversion of hydrodynamic pressure fluctuations into noise pressure that radiates therefrom. A noise reduction is achieved in that the discontinuity of the compensation of the turbulent surface flow pressure fluctuations along the solid and rigid upper rear edge 5 of the slat 1 is made gentler, to achieve a gradual compensation of the turbulent alternating pressure cells in the flow direction, due to the finite and limited air throughflow resistance of the airflow separation surface 6 formed by the bristles 7, with a similar effect as a porous edge member.

When the slat 1 is moved to the retracted position against the forward nose of the main wing body 2, the airflow separation surface 6 formed of the bristles 7 extending from the upper rear or trailing edge 5 of the slat 1 is also moved to a stowed configuration. Either, the bristles 7 can extend flushly along the upper surface 10 of the main wing body 2, or the bristles 7 can be tilted inwardly and downwardly into the gap 9, so as to be stored in the sickle-shaped space between the concave rear surface 3 of the slat 1 and the convex forward surface of the forward nose of the main wing body 2, when the slat 1 is moved close to the wing body 2 in the retracted position. This tilting motion of the bristles 7 can be achieved via a carrier element 17 connected or coupled to the movement and guiding mechanism of the slat 1, similarly to the arrangement discussed above in connection with the bristles 7 at the bottom rear edge 4 of the slat 1.

Throughout this specification, the term "bristle" 7 refers to any bristle, fiber, hair, thread, ribbon, tape or the like, that is generally elongate in its configuration and aspect ratio. As a non-limiting example, each bristle 7 may have an aspect ratio (of its length relative to its maximum width) of at least 10 or even at least or greater than 20. In other words, generally, the length is substantially greater than the maximum width. As examples, the length of the bristles 7 may be at least equal to or greater than one half of the distance between the lower rear edge 4 and the upper rear edge 5 of the slat 1, or preferably the bristle length is at least 10% of a slat chord of the slat. Also, each bristle 7 may have a substantially circular cross-section in the manner of a fiber or thread, or may have a square cross-section, or may have a flat wide cross-section, e.g. a rectangular cross-section, in the manner of a tape or ribbon.

Furthermore, the airflow separation surface 6 arranged along the lower rear or trailing edge 4 or along the upper rear or trailing edge 5 of the slat 1 can be made of one row of bristles 7 along the span direction as shown in FIGS. 1 to 4, or could be made up of two or three or more rows of such bristles 7. Also, each row of bristles 7 can involve individual bristles 7 arranged distributed or spaced from one another along the span direction, or several bristles 7 can be grouped together to form a bristle bundle, with several of such bristle bundles arranged successively distributed along the span direction to form a row of such bristle bundles of the bristles 7 that makes up the separation surface 6.

The number and density of the bristles 7 along the span direction, and the provision of one or more rows thereof, is selected to achieve a defined limited air permeation resistance through the airflow separation surface 6 formed by the bristles 7, particularly so that the discontinuity of compensation of the turbulent surface pressure fluctuations on the respective rigid rear edge of the slat 1 is instead replaced by a gradual compensation of the turbulent alternating pressure fluctuations in the flow direction along the separation surface 6 formed by the bristles 7 due to the finite limited air throughflow or permeation resistance thereof. Furthermore, the bristles 7 and/or bristle bundles are arranged with a density along the span direction, so that at least gaps will remain between densely positioned bristles, to provide an air permeability at these locations for portions of the gap airflow without a complete enclosing or sealing of the concavely curved inner area formed by the concave rear surface 3 of the slat 1, so as to allow a pressure compensation through the separation surface 6 formed by the bristles 7.

In order to demonstrate the noise reduction that can be achieved by providing the inventive arrangements in connection with a wing configuration including an extendible leading edge slat 1 and a main wing body 2, wind tunnel tests have been carried out using a wing model having a scale of 1:6 relative to a full size wing arrangement of a representative modern commercial passenger transport aircraft. The results of the tests are shown by the respective measured noise level curves in FIGS. 5 to 8.

In each test, the noise level was measured using a microphone and a concave acoustic reflector or sound mirror, whereby the generated noise level was measured while moving this microphone and reflector arrangement in a forward-aft direction relative to the wing arrangement being tested in the wind tunnel. These noise measurements recorded the noise level generated by the two most significant noise sources, namely the extended slat at a forward-aft position of X=−320 mm, and the side edge of the extended landing flap at X=60 mm, whereby X represents the forward-aft coordinate of the movement or traversal path of the microphone and acoustic reflector.

As respectively shown in FIGS. 5 to 8, the noise level generated by a comparative wing arrangement with a slat extended from a main wing body, but without the inventive noise reduction measures, is shown by a continuous solid line curve. On the other hand, the noise levels generated by an inventive wing configuration including bristles 7 forming an airflow separation surface 6 along the slat gap of the extended slat as described above are shown with a dashed line curve. FIGS. 5 to 8 respectively show the noise measurement results at frequencies of 2.5 kHz, 3.15 kHz, 4 kHz, and 5 kHz. The results show that the inventive arrangement achieves a significant noise reduction in the area of the extended slat at all of the tested noise frequencies, with an especially pronounced noise reduction at the lower frequencies, e.g. at 2.5 kHz and at 3.15 kHz. The maximum achievable noise reduction is up to 15 dB, and is greater than 5 dB even at the frequencies of 4 kHz and 5 kHz.

Figure 5:
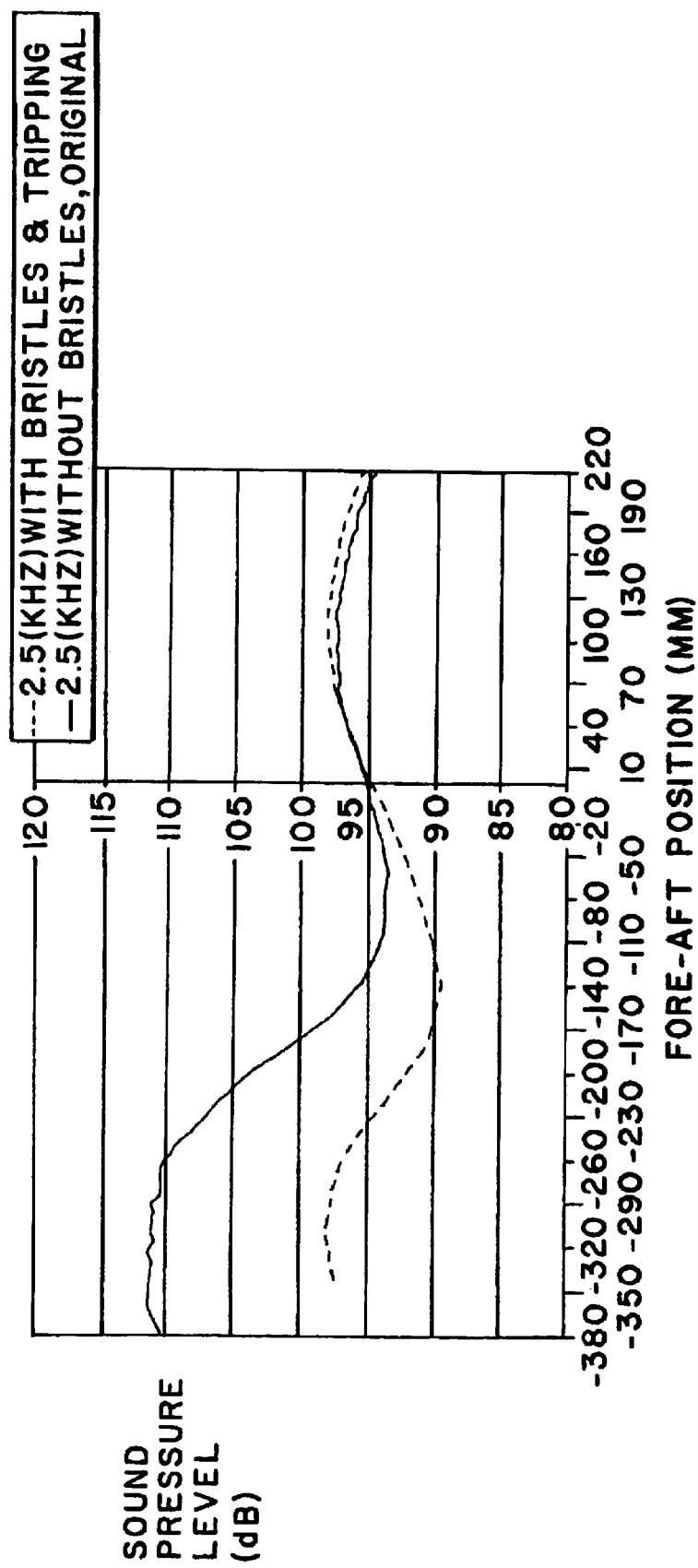
FIG. 5 is a diagram plotting the noise level as a function of the forward-aft position along a wing with an extended slat and an extended flap, as measured in a test, once for a conventional wing configuration without a row of bristles forming an airflow separation surface in the slat air gap, and once for an inventive configuration with a row of bristles forming an airflow separation surface in the slat air gap, respectively for aerodynamic noise generated at a frequency of 2.5 kHz.
Figure 6:
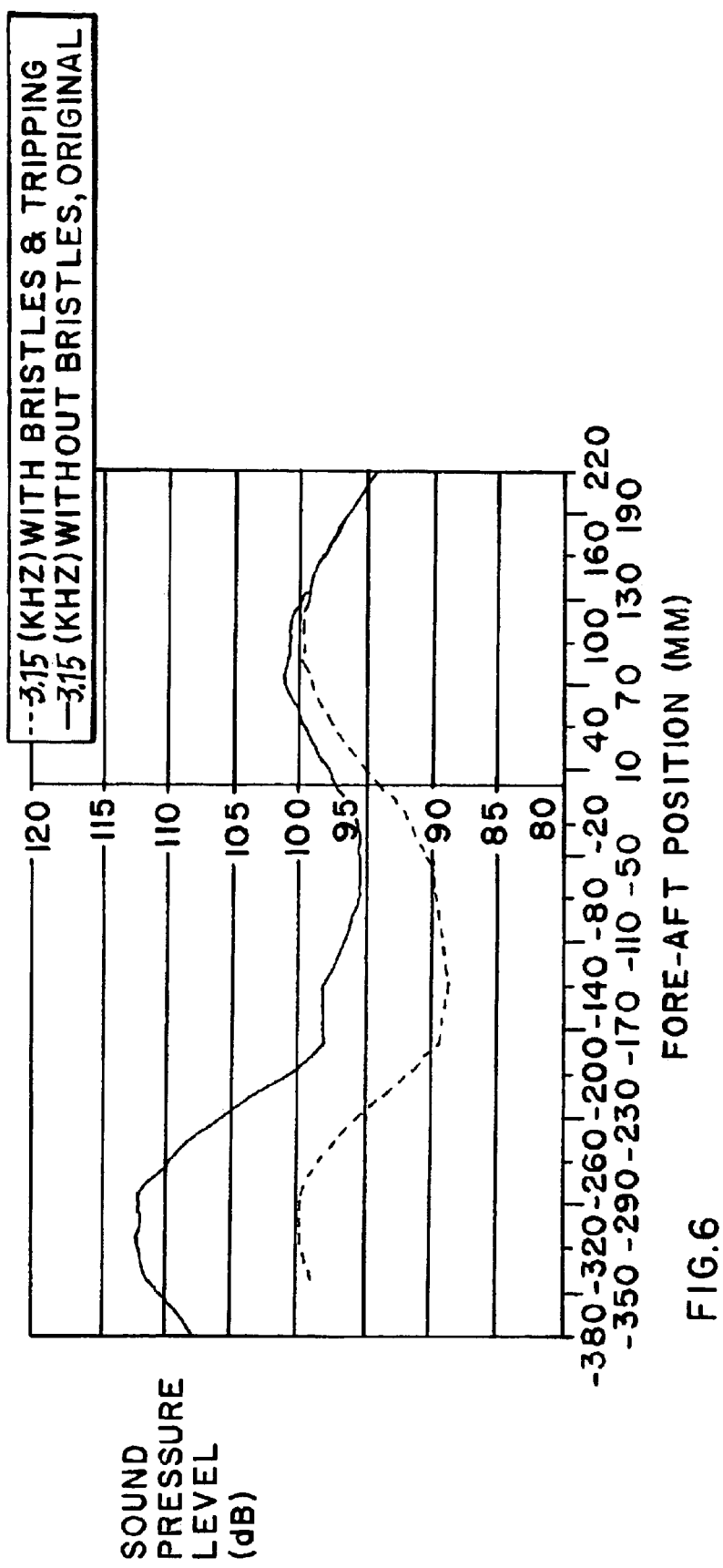
FIG. 6 is a noise curve diagram corresponding to FIG. 5, but for a noise frequency of 3.15 kHz.
Figure 7:
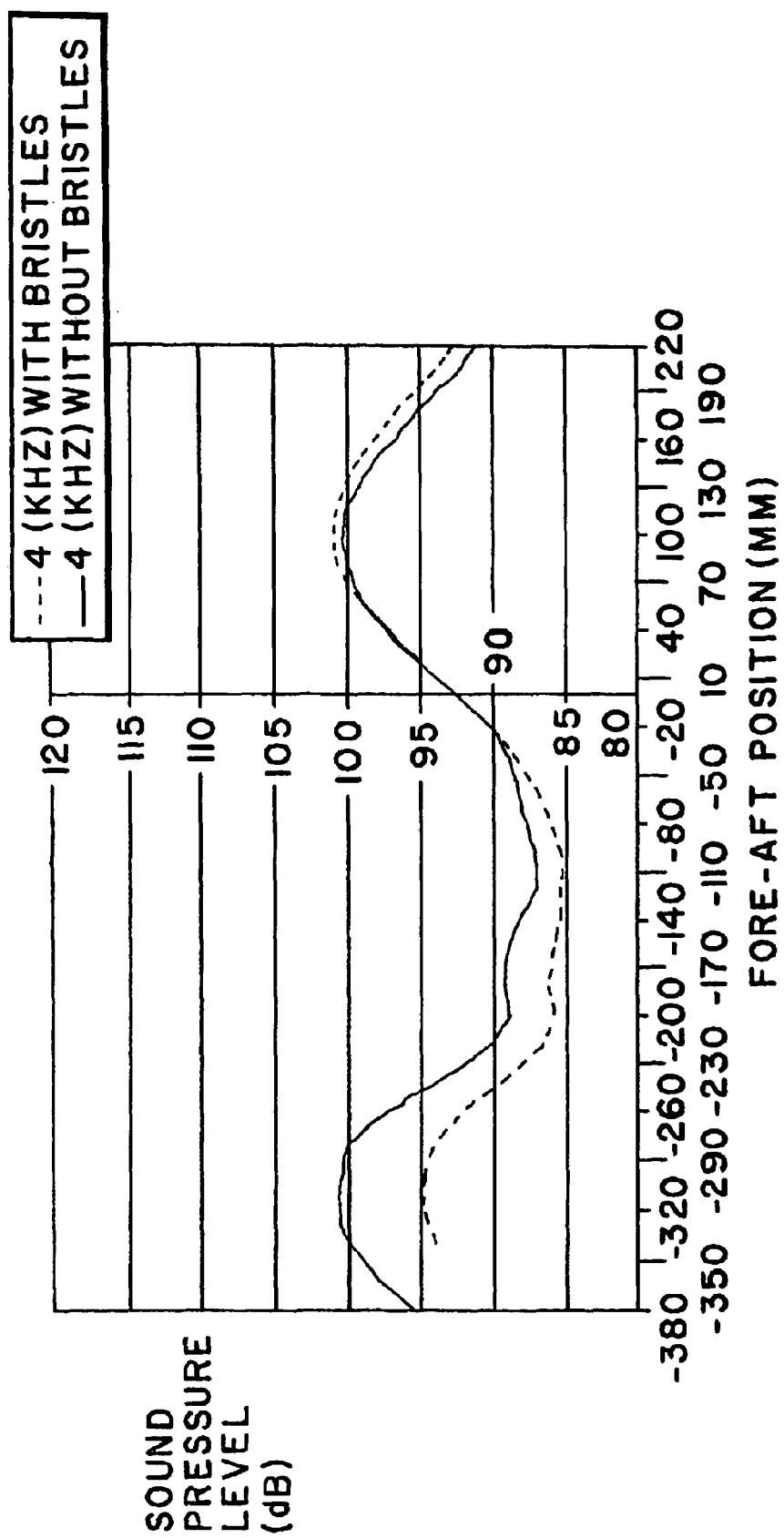
FIG. 7 is a noise curve diagram corresponding to FIG. 5, but for a noise frequency of 4 kHz.
Figure 8:
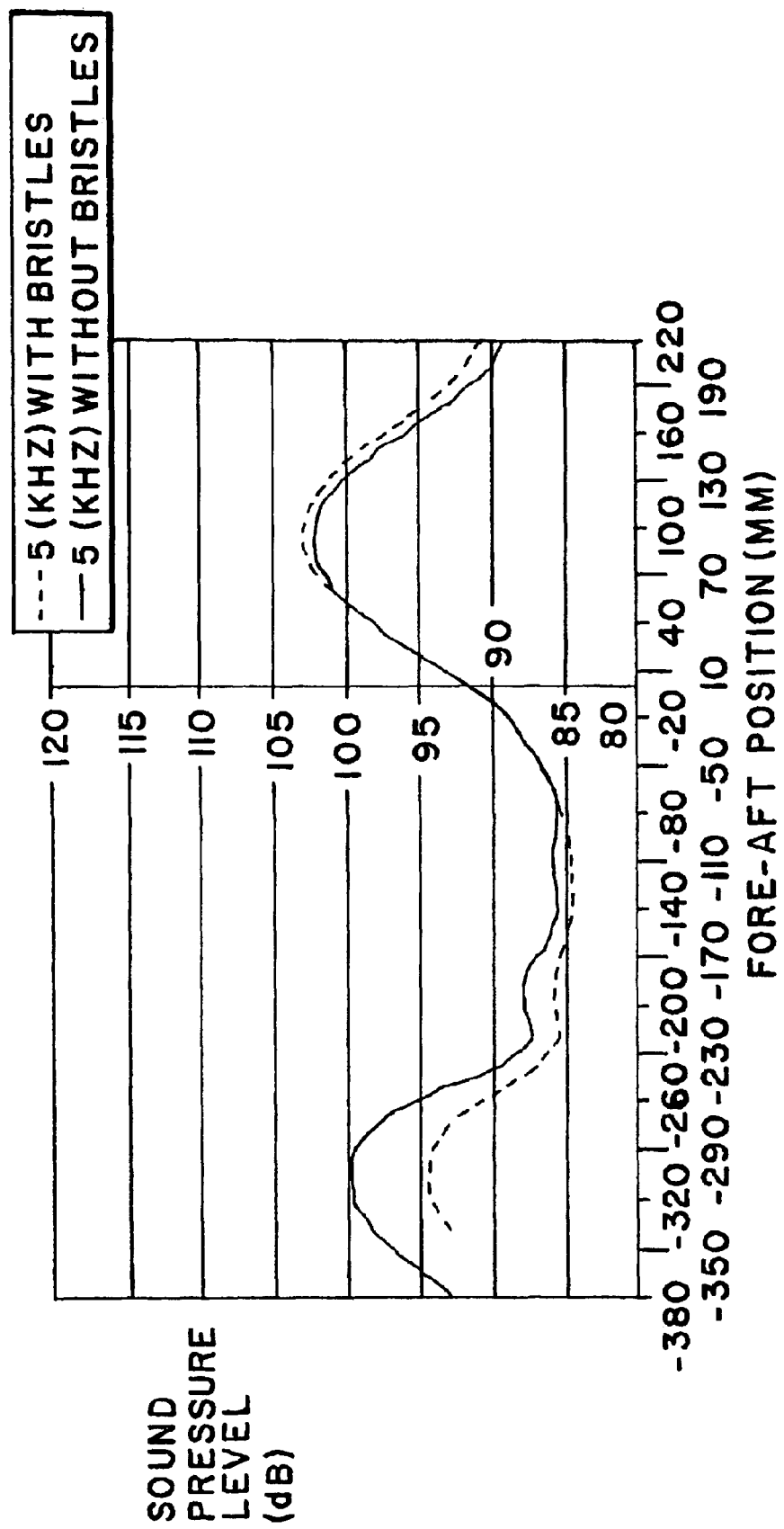
FIG. 8 is a noise curve diagram corresponding to FIG. 5, but for a noise frequency of 5 kHz.

Especially regarding FIGS. 5 and 6, the tests were carried out with optimum arrangements of the slat bristles and of boundary layer tripping devices. The slat bristles had optimum dimensions in terms of length and thickness as well as optimum flexibility for proper self adjustment according to local flow directions. The boundary layer tripping devices, which are not directly significant to the present invention, were arranged, on the small scale wing model during model scale validation tests, in order to imitate realistic full scale flow conditions.

What is claimed is:

1. In an aircraft including a wing arrangement, wherein said wing arrangement includes a wing body and a slat, said wing body terminates forwardly in a forward nose of said wing body, said slat has a concave rear surface facing toward said forward nose, and said slat is movably connected to said wing body to be movable between a retracted slat position in which said slat is adjacent to said forward nose with said concave rear surface facing and adjacent to said forward nose and an extended slat position in which said slat is spaced away from said forward nose with a slat air gap bounded between said slat and said forward nose, an improvement for reducing aero-acoustic noise generated by said wing arrangement, wherein said improvement comprises:

an airflow separation surface comprising a plurality of bristles arranged as at least one row of said bristles distributed in a span direction along and protruding from at least one of an upper rear edge of said slat and a lower rear edge of said slat, wherein said bristles are sufficiently flexible so as to be flexibly self-contouring due to aerodynamic forces of air flowing through said slat air gap during flight of said aircraft with said slat in said extended slat position.

2. The improvement in the aircraft according to claim 1, wherein said bristles are arranged along and protruding from said lower rear edge of said slat into said slat air gap.

3. A wing arrangement for an aircraft, comprising:

a wing body having a forward nose;

a slat that has a concave rear surface facing toward said forward nose of said wing body, wherein a slat air gap is formed between said concave rear surface of said slat and said forward nose of said wing body with said slat in an extended position relative to said wing body; and at least one of a first flexible air-permeable airflow separation surface extending in a span direction along and protruding into said slat air gap from a lower rear edge of said slat, and a second flexible air-permeable airflow separation surface extending in said span direction along and protruding rearwardly above said slat air gap from an upper rear edge of said slat, wherein said respective flexible air-permeable airflow separation surface allows a limited positive air permeation therethrough, and wherein said respective flexible air-permeable airflow separation surface is sufficiently flexible so as to be flexibly self-contouring due to aerodynamic forces of air flowing through said slat air gap during flight of the aircraft.

4. The wing arrangement according to claim 3, wherein said respective flexible air-permeable airflow separation surface comprises and is formed by at least one row of flexible bristles that are distributed along said span direction and protrude perpendicularly relative to said span direction.

5. The wing arrangement according to claim 3, comprising maid first flexible air-permeable airflow separation surface.

6. The wing arrangement according to claim 3, comprising said second flexible air-permeable airflow separation surface.

7. A wing arrangement for an aircraft, comprising:

a wing body having a convex forward nose;

a slat that has a concave rear surface facing toward said convex forward nose of said wing body, wherein a slat air gap is formed between said concave rear surface of maid slat and said convex forward nose of said wing body with said slat in an extended position relative to said wing body; and at least one respective row of bristles distributed in a span direction along respectively at least one of a lower rear edge of said slat at an inlet of said slat air gap and an upper rear edge of said slat at an outlet of said slat air gap to form of said bristles a respective airflow separation surface, wherein said bristles are respectively elongated and flexible with a sufficient flexibility so that said bristles are flexibly deformable to different contour configurations in a self-adapting manner in response to varying aerodynamic forces exerted on said bristles by an airflow flowing through said slat air gap during flight of the aircraft respectively in different flight configurations.

8. The wing arrangement according to claim 7, wherein said at least one respective row of said bristles is effective to reduce a sound level of aerodynamic noise emanated from said wing arrangement with said bristles relative to a sound level of aerodynamic noise emanated without said bristles.

9. The wing arrangement according to claim 7, comprising said at least one row of said bristles along said lover rear edge of said slat.

10. The wing arrangement according to claim 7, comprising said at least one row of said bristles along said upper rear edge of said slat.

11. The wing arrangement according to claim 7, respectively comprising at least one row of said bristles along maid lower rear edge of said slat and comprising at least one row of said bristles a long said upper rear edge of said slat.

12. The wing arrangement according to claim 7, further comprising a carrier element that extends longitudinally in maid span direction and is movably connected to said lower rear edge or said upper rear edge of said slat, and wherein said bristles are connected to and protrude from said carrier element.

13. The wing arrangement according to claim 12, wherein respective groups of said bristles are grouped together to form respective bundles of said bristles, wherein said bundles are distributed along said span direction to form at least one row of said bundles on said carrier element.

14. The wing arrangement according to claim 7, wherein said slat is selectively extendible from said wing body into said extended position and selectively retractable toward maid wing body into a retracted position in which said concave rear surface of said slat lies closely along said convex forward nose of said wing body, and further comprising a slat extension mechanism that movably connects said slat to said wing body and that selectively extends and retracts said slat relative to said wing body, and a carrier element that is operatively coupled to said slat extension mechanism so as to be movable relative to said wing body and relative to said slat, wherein said bristles are connected to and protrude from said carrier element.

15. The wing arrangement according to claim 7, wherein said slat is selectively extendible from said wing body into said extended position and selectively retractable toward said wing body into a retracted position in which said concave rear surface of said slat lies closely along said convex forward nose of said wing body, and wherein said bristles extend f lushly along an outer surface of said wing body outside of an area between said concave rear surface of said slat and said convex forward nose of said wing body when maid slat is in maid retracted position.

16. The wing arrangement according to claim 7, wherein said slat is selectively extendible from said wing body into said extended position and selectively retractable toward said wing body into a retracted position in which said concave rear surface of said slat lies closely along said convex forward nose of said wing body, and wherein said bristles extend in an area between said concave rear surface of said slat and said convex forward nose of said wing body when said slat is in said retracted position.

17. The wing arrangement according to claim 7, wherein said flexibility is sufficiently rigid so that said bristles are self-supporting and form-stable against the force of gravity.

18. The wing arrangement according to claim 7, wherein said bristles are arranged with a certain bristle density in said span direction, so as to achieve a smooth gradient of compensation of turbulent pressure fluctuations in a flow direction from said respective lower rear edge or upper rear edge of said slat along a longitudinal extension of each of said bristles.

19. The wing arrangement according to claim 7, wherein said bristles are arranged with a certain bristle density in said span direction to achieve a certain air-permeability at least at certain locations along said span direction to allow an air pressure compensation through said at least one row of said bristles and to prevent a complete sealed enclosing of a apace between said concave rear surface and said at least one row of said bristles along said lower rear edge of said slat.

20. The wing arrangement according to claim 7, wherein said bristles each respectively have a length of at least 10% of a slat chord of said slat.

* * * * *

UNITED STATES PATENT AND TRADEMARK OFFICE
CERTIFICATE OF CORRECTION

PATENT NO. : 6,789,769 B2  Page 1 of 1
APPLICATION NO. : 10/302454
DATED : September 14, 2004
INVENTOR(S) : Mau et al.

It is certified that error appears in the above-identified patent and that said Letters Patent is hereby corrected as shown below:

Column 12,
Line 5, replace "maid" by --said--;
Line 21, replace "cutlet" by --outlet--;
Line 43, replace "maid" by --said--;
Line 48, replace "maid" by --said--;
Line 60, replace "maid" by --said--;

Column 13,
Line 12, replace "maid" first occurrence by --said--;
Line 12, replace "maid" second occurrence by --said--;

Column 14,
Line 15, replace "apace" by --space--.

Signed and Sealed this

Fourth Day of September, 2007

JON W. DUDAS
*Director of the United States Patent and Trademark Office*